United States Patent
Bae et al.

(10) Patent No.: US 8,390,432 B2
(45) Date of Patent: Mar. 5, 2013

(54) APPARATUS AND METHOD OF CONTROLLING DIGITAL APPLIANCES BASED ON PARKING MANAGEMENT

(75) Inventors: Yu Seok Bae, Daejeon (KR); Bong Jin Oh, Daejeon (KR); Kyeong Deok Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 782 days.

(21) Appl. No.: 12/505,741

(22) Filed: Jul. 20, 2009

(65) Prior Publication Data

US 2010/0156608 A1    Jun. 24, 2010

(30) Foreign Application Priority Data

Dec. 22, 2008  (KR) .................. 10-2008-0131374

(51) Int. Cl.
*G05B 13/00* (2006.01)
(52) U.S. Cl. .............. 340/10.5; 340/286.01; 340/994; 340/286.02; 700/276; 700/275; 455/3.06
(58) Field of Classification Search ............ 340/286.01, 340/286.02, 994, 10.5; 700/276, 275; 455/3.06
See application file for complete search history.

(56) References Cited

U.S. PATENT DOCUMENTS

| | | | |
|---|---|---|---|
| 6,236,395 B1 * | 5/2001 | Sezan et al. | 715/723 |
| 7,072,945 B1 * | 7/2006 | Nieminen et al. | 709/217 |
| 7,483,964 B1 * | 1/2009 | Jackson et al. | 709/221 |
| 7,884,727 B2 * | 2/2011 | Tran | 340/573.1 |
| 2004/0093155 A1 * | 5/2004 | Simonds et al. | 701/200 |
| 2004/0107352 A1 * | 6/2004 | Yui et al. | 713/185 |
| 2005/0088281 A1 * | 4/2005 | Rohrberg et al. | 340/5.71 |
| 2005/0090915 A1 * | 4/2005 | Geiwitz | 700/90 |
| 2005/0096753 A1 | 5/2005 | Arling et al. | |
| 2007/0016364 A1 * | 1/2007 | Lee et al. | 701/207 |
| 2007/0061725 A1 * | 3/2007 | Isaac et al. | 715/717 |
| 2007/0159296 A1 * | 7/2007 | Lee et al. | 340/5.23 |
| 2008/0108301 A1 * | 5/2008 | Dorenbosch | 455/3.06 |
| 2010/0127854 A1 * | 5/2010 | Helvick et al. | 340/539.14 |

FOREIGN PATENT DOCUMENTS

| | | |
|---|---|---|
| KR | 1020030075020 A | 9/2003 |
| KR | 1020070075556 A | 7/2007 |
| KR | 1020080009931 A | 1/2008 |
| KR | 1020080104410 A | 12/2008 |

* cited by examiner

*Primary Examiner* — Jennifer Mehood
*Assistant Examiner* — Andrew Bee
(74) *Attorney, Agent, or Firm* — Ladas & Parry LLP

(57) ABSTRACT

An apparatus for controlling digital appliances based on parking management is disclosed. The apparatus includes an interface unit, connected to a control terminal through a wired/wireless communication network, for providing an interface for establishing a home network service environment that is dependent upon information about incoming or outgoing vehicle; a storage unit for storing the home network service environment established by the interface; and an appliance controller for controlling the digital appliances based on the home network service environment stored in the storage unit, upon receipt of the information about incoming or outgoing vehicle.

12 Claims, 3 Drawing Sheets

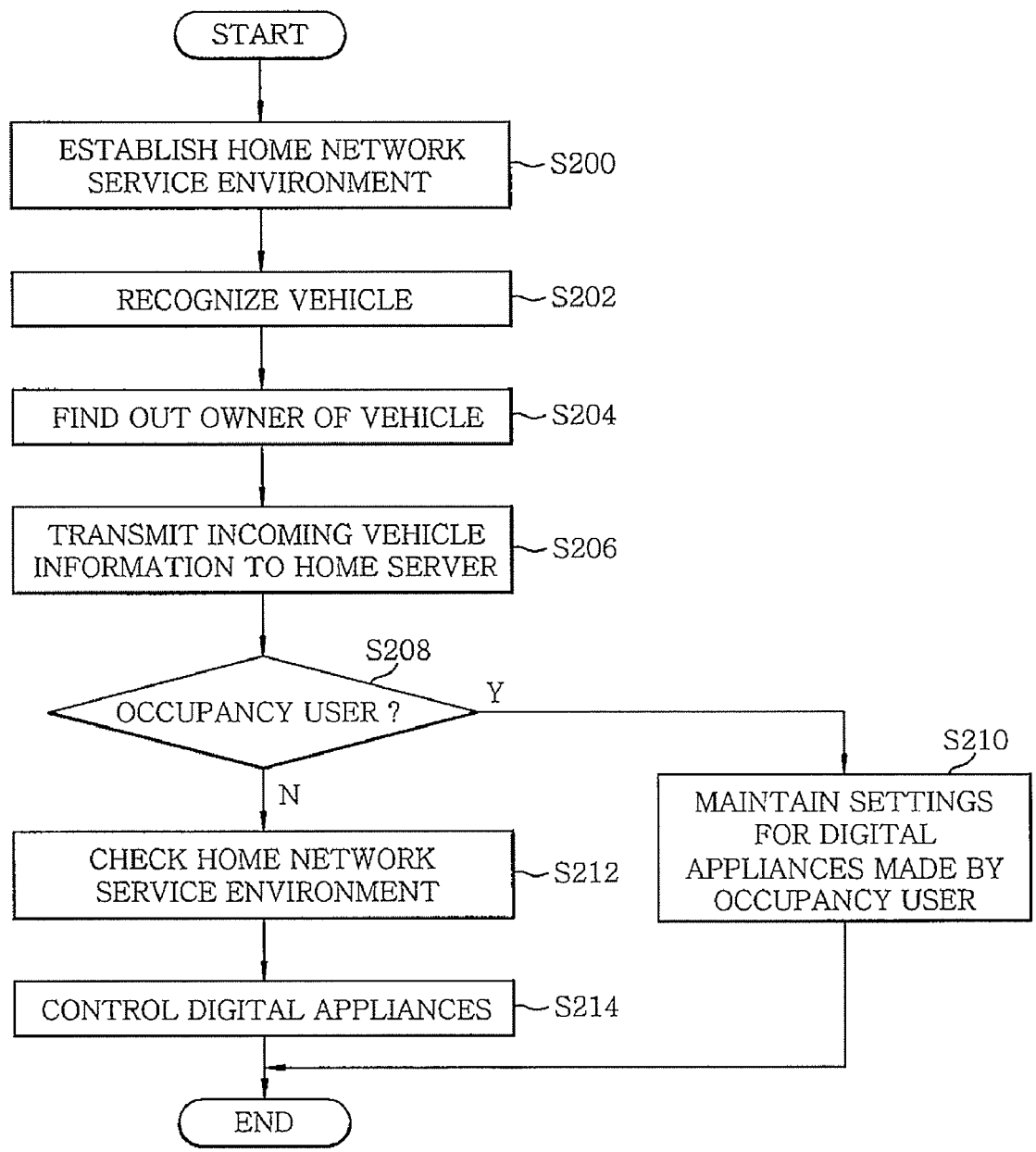

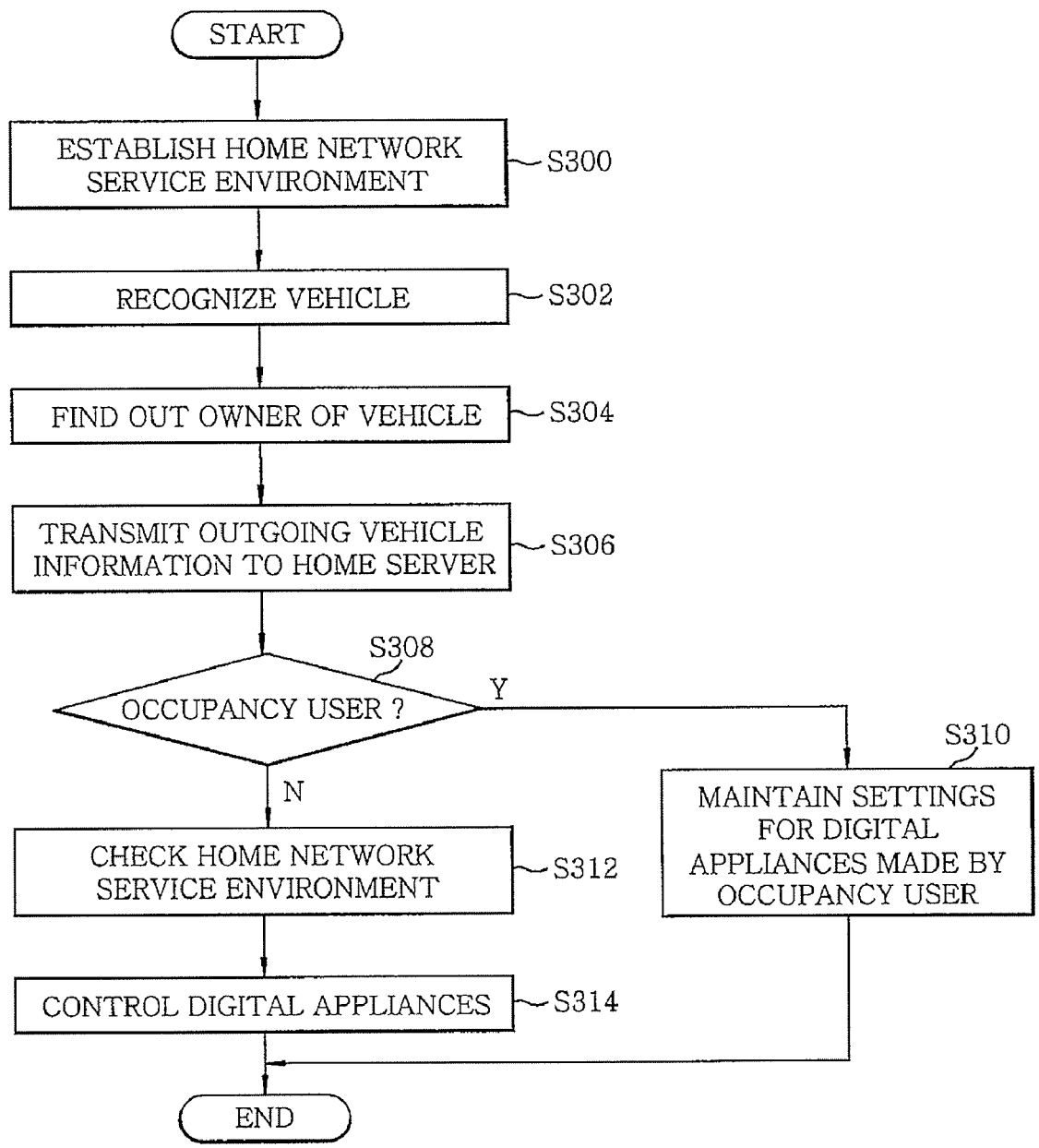

APPARATUS AND METHOD OF CONTROLLING DIGITAL APPLIANCES BASED ON PARKING MANAGEMENT

CROSS-REFERENCE(S) TO RELATED APPLICATION(S)

The present invention claims priority of Korean Patent Application No. 10-2008-0131374, filed on Dec. 22, 2008, which is incorporated herein by reference.

FIELD OF THE INVENTION

The present invention relates to a digital appliance controlling system, and more particularly, to an apparatus and method of controlling digital appliances based on information about incoming or outgoing vehicles.

BACKGROUND OF THE INVENTION

With the recent development in technologies, home network services come into wide use. It is known that conventional systems offering these services can control the operations of all electronic devices installed at home.

Meanwhile, the function of recognizing incoming or outgoing vehicles is generally provided in the parking place of homes or apartments. Typically, the home network services detect users who take in or out of homes or apartments, and integrally control electronic devices based on the detection results or control them upon request of users.

Even though such function of detecting incoming or outgoing vehicles is provided at homes or apartments, the home network services are not done in conjunction with the home network. Thus, the users have to control digital appliances separately after parking their vehicles in the parking place and then coming into the house, which renders very inconvenient.

SUMMARY OF THE INVENTION

In view of the forgoing, the present invention provides an apparatus and method of automatically controlling digital appliances in compliance with a pre-established home network service environment based on parking management.

In accordance with an aspect of the present invention, there is provided an apparatus for controlling digital appliances based on parking management, including:

an interface unit, connected to a control terminal through a wired/wireless communication network, for providing an interface for establishing a home network service environment that is dependent upon information about incoming or outgoing vehicle;

a storage unit for storing the home network service environment established by the interface; and an appliance controller for controlling the digital appliances based on the home network service environment stored in the storage unit, upon receipt of the information about incoming or outgoing vehicle.

In accordance with another aspect of the present invention, there is provided a method for control of digital appliances based on parking management, including:

providing a control terminal with an interface for establishing a home network service environment that is dependent upon information about incoming or outgoing vehicle;

storing the home network service environment established by the interface in a storage unit; and controlling the digital appliances based on the home network service environment stored in the storage unit, upon receipt of the information about incoming or outgoing vehicle.

BRIEF DESCRIPTION OF THE DRAWINGS

The above and other objects and features of the present invention will become apparent from the following description of preferred embodiments, given in conjunction with the accompanying drawings, in which:

FIG. 2 shows a flow chart for explaining a procedure of controlling digital appliances based on information about incoming vehicles to a parking place in accordance with the present invention; and FIG. 3 illustrates a flow chart for explaining a procedure of controlling digital appliances based on information about outgoing vehicles from a parking place in accordance with the present invention.

DETAILED DESCRIPTION OF THE EMBODIMENTS

Figure 1:
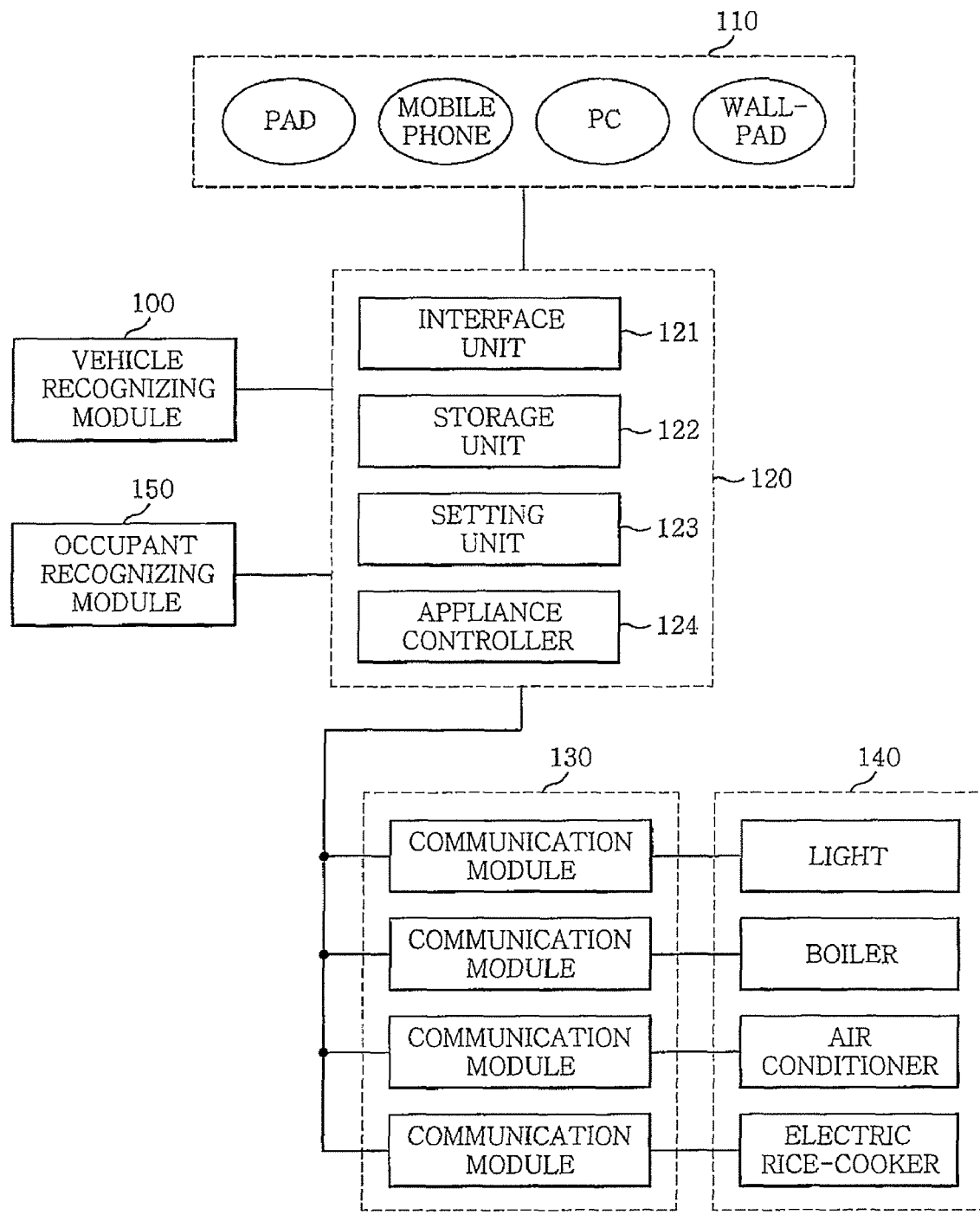
FIG. 1 illustrates a block diagram of an apparatus of controlling digital appliances based on information about incoming or outgoing vehicles in accordance with the present invention.

Hereinafter, exemplary embodiments of the present invention will be described in detail with reference to the accompanying drawings.

FIG. 1 illustrates a block diagram of an apparatus of controlling digital appliances based on information about incoming or outgoing vehicles in accordance with the present invention.

As shown in FIG. 1, the inventive apparatus for control of digital appliances includes a vehicle recognizing module 100, a control terminal 110, a home server 120, a communication module 130 and digital appliances 140.

The vehicle recognizing module 100 recognizes whether there is any vehicle that takes in or out of the parking place, and transmits the recognition result to the home server 120. An example of a method of recognizing whether there is any incoming or outgoing vehicle involves identifying a radio identification mark or an RFID tag attached to a vehicle in the entrance of a collective housing area or in a parking place, or by identifying a vehicle's license number in the entrance of a collective housing area or in a parking place.

The control terminal 110 establishes a home network service environment to control the digital appliances 140 and may be, for example, a PDA, a mobile phone, a handheld PC (H/PC), or a wall-pad. Examples of the digital appliances 140 may include lighting, a boiler, an air conditioner, an electric-rice cooker and so on.

Further, the home network service environment may be automatically established by analyzing a control pattern of the user taken to control the digital appliances when the user takes a vehicle in or out of the parking place.

The home server 120 is installed at home or office and communicates via a wired/wireless home network with the vehicle recognizing module 100 and the digital appliances 140 located at places, such as homes or offices. The home server 120 automatically controls the digital appliances 140 in accordance with the home network service environment established through the control terminal 110, depending on whether a vehicle of the user takes in or out of a parking place.

The wired/wireless home network may be implemented with Ethernet, serial, power line communication (PLC), wireless LAN, Bluetooth, ZigBee or the like.

In addition, the home server 120 may be connected to a wire/wireless communication network to receive a home network service environment established through the control terminal 110 in remote and update the established home network environment. Further, the home server 120 stores information on the digital appliances 140 and provides the user with the home network service environment. As shown, the home server 120 includes an interface unit 121, a storage unit 122, a setting unit 123, and an appliance controller 124.

The interface unit 121, which is connected to the control terminal 110 via the wired/wireless home network, provides an interface between the control terminal 110 and the home server 120. In addition, the interface unit 121 offers the control terminal 110 information on the home network service environment stored in the storage unit 122 in response to a request from the user. By doing so, the user can confirm the home network service environment that he or she has established and allows a user to add, eliminate or modify the settings on the home network service environment stored in the storage unit 121.

The storage unit 12 serves to store the home network service environment established by the control terminal 110.

The setting unit 123 automatically sets the home network service environment based on the information about incoming or outgoing vehicles by analyzing usage patterns of the user. That is, the setting unit 123 can automatically set the home network service environment by storing control commands for the digital appliances taken by the user after taking his or her vehicle in the parking place and then analyzing the usage patterns on the basis of the control commands, or by storing control commands for the digital appliance taken by the user just before taking his or her vehicle out of the parking place and then analyzing the usage patterns on the basis of the commands. In this manner, the home network service environment set by the setting unit 123 is stored in the storage unit 122.

The appliance controller 124 basically controls the digital appliances 140 based on the home network service environment stored in the storage unit 122, upon receipt of information on incoming or outgoing vehicle. In addition, the appliance controller 124 compares the home network service environment stored in the storage unit 122 with settings for the digital appliances made by another user at home to control the digital appliances 140 depending on the settings by other occupancy user at home, prior to controlling the digital appliances. This function intends to automatically control the digital appliances 140 so that the settings by the occupancy users at home have a higher priority over the home network service environment stored in the storage unit 122 in order not to feel any inconvenient for the occupancy user at home.

That is to say, the appliance controller 124 controls the digital appliances 140 by checking the presence of the occupancy users at home, prior to controlling the digital appliances 140 pursuant to the home network service environment. For example, assuming that a certain user takes his/her vehicle out of the parking place and the home network service environment for the certain user stored in the storage unit 122 is programmed to turn-off a light; but that another occupancy user at home wants to turn-on the light, the appliance controller 124 checks whether the occupancy users is presently at home to keep the light in a turn-on state even though the vehicle of the certain user takes out of the parking place.

To accomplish the above function, the inventive system further includes an occupant recognizing module 150 which identifies the occupancy users who are at home. The identification of an occupancy user at home may be made by using a digital door lock or an ID card, each having user's ID information. For the digital door lock, the occupant recognizing module 150 recognizes the usage of the digital door lock in the entrance of the occupancy user and provides the occupancy user's information recognized from the digital door lock to the home server 120. In similar, for the digital door lock, the occupant recognizing module 150 recognizes the usage of the ID card in the entrance of the occupancy user and provides the occupancy user's information recognized from the ID card to the home server 120

Alternatively, it is also possible use a USIM (universal subscriber identify module) card installed in a mobile phone. In this case, the identification of the occupancy user at home may be made by performing that the mobile phone periodically communicates to the home server 120 through the use of Bluetooth, ZigBee or the like to provide the occupancy user's information on the USIM card to the home server 120 in the entrance of the occupancy user.

FIG. 2 illustrates a flow chart for explaining a procedure of controlling digital appliances based on information about incoming vehicles to a parking place in accordance with the present invention.

Referring to FIG. 2, a user makes a connection to the home server 120 through his or her control terminal 110, and establishes a home network service environment to be executed when his or her vehicle takes in a parking place in step S200.

Next, when the vehicle takes in the parking place, the vehicle recognizing module 100 recognizes the incoming vehicle in step S202, and finds out an owner of the vehicle in step S204. And then, in step S206, the vehicle recognizing module 100 transmits a signal indicative of the incoming vehicle to the home server 120 at home or office to which the owner of the vehicle belongs. Here, the incoming vehicle can be recognized by identifying a radio identification mark or an RFID tag attached to the vehicle in the entrance of a collective housing area or in the parking place, or by identifying a vehicle's license number in the parking place, and the owner of the vehicle can be found on the basis of the identified radio identification mark, RFID tag or vehicle's license number.

Subsequently, in step S208, the home server 120 checks whether or not there are any occupancy users at home, prior to controlling the digital appliances 140. If it is checked that one or more occupancy users are present at home, the home server 120 maintains the settings for the digital appliances by the occupancy users, in step S210.

If, however, it is checked that none of occupancy users are present at home, the home server 120 checks the established home network service environment upon receipt of the signal indicating the incoming vehicle in step S212, and then controls the digital appliances 140 connected through the communication module 130 depending on the established service environment, in step S214.

FIG. 3 illustrates a flow chart for explaining a procedure of controlling digital appliances based on information about outgoing vehicles from a parking place in accordance with the present invention.

Referring to FIG. 3, a user makes a connection to the home server 120 through his or her control terminal 110, and establishes a home network service environment to be executed when his or her vehicle takes out of a parking place in step S300.

Next, when the user takes the vehicle out of the parking place, the vehicle recognizing module 100 recognizes the outgoing vehicle in step S302, and finds out an owner of the vehicle in step S304. And then, in step S306, the vehicle recognizing module 100 transmits a signal indicative of the outgoing vehicle to the home server 120 at home or office to which the owner of the vehicle belongs. In this case, the outgoing vehicle can be recognized by identifying a radio identification mark or an RFID tag attached to the vehicle in the entrance of a collective housing area or in the parking place, or by identifying a vehicle's license number in the parking place, and the owner of the vehicle can be found on the basis of the identified radio identification mark, RFID tag or vehicle's license number.

Subsequently, in step S308, the home server 120 checks ether or not there are any occupancy users at home, prior to controlling the digital appliances 140. If it is checked the presence of the occupancy user at home, the home server 120 maintains the settings for the digital appliances by the occupancy user, in step S310.

If, however, it is checked that none of occupancy users are present at home, the home server 120 checks the established home network service environment stored in the storage unit 122 based on the outgoing vehicle, in step S312, and then controls the digital appliances 140 connected through the communication module 130 depending on the established home network service environment in step S314.

Some examples of controlling the digital appliances based on the parking management as above are as follows.

First, when a vehicle takes in a collective housing area or a parking place, an illumination sensor (not shown) installed in a living room is checked based on the established home network service environment. If the living room is dark, a light located in the living room can be automatically turned on. Also, an electric-rice cooker may be automatically turned on to prepare rice. And an outdoor temperature sensor (not shown) and an inner temperature sensor (not shown) are checked in the winter season, and if the inner temperature is relatively lower than the outdoor temperature, a boiler is automatically running to raise the inner temperature. And if the inner temperature is much higher than the outdoor temperature in the summer season, an air conditioner is automatically running to lower the indoor temperature. Also if the indoor air quality is poor, a window can be automatically open to change the indoor air. Additionally, the digital appliances may be controlled depending on information about incoming vehicles, thereby offering the user good services and conveniences.

Meanwhile, when a vehicle takes out of a collective housing area or parking place, a light installed in a living room may be automatically changed into turn-off from turn-on, depending on the settings of the established home network service environment. Also, in this case, unnecessary powers in places excepting a kitchen within the house may be automatically turned off, and an air conditioner or a boiler may be turned off. In addition, a gas valve may be automatically closed and a window may be automatically shut down if it was open. Besides, when the vehicle takes out of the parking place, all in-house appliances may be automatically controlled to save energy and provide security function and convenience to the user.

As described above, the present invention can automatically control the digital appliances based on information about incoming or outgoing vehicles, thereby giving users convenience.

While the invention has been shown and described with respect to the particular embodiments, it will be understood by those skilled in the art that various changes and modification may be made without departing from the scope of the invention as defined in the following claims.

What is claimed is:

1. An apparatus for controlling digital appliances based on parking management, comprising:
   an interface unit, connected to a control terminal through a wired/wireless communication network, for providing an interface for establishing a home network service environment that is dependent upon information about an incoming or outgoing vehicle;
   a storage unit for storing the home network service environment established by the interface unit;
   an appliance controller for controlling the digital appliances based on the home network service environment stored in the storage unit, upon receipt of the information about the incoming or outgoing vehicle; and
   an occupant recognizing module for identifying the presence of an occupancy user who is at home,
   wherein the appliance controller controls the digital appliances by checking the presence of other occupancy user, prior to controlling the digital appliances pursuant to the home network service environment stored in the storage unit; and
   wherein the identification of the occupancy user at home is made by a digital door lock having ID information on the occupancy user, and the occupant recognizing module recognizes the usage of the digital door lock in the entrance of the occupancy user and provides the occupancy user's ID information recognized from the digital door lock to the appliance controller.

2. The apparatus of claim 1, wherein the interface unit provides the control terminal with information on the home network service environment stored in the storage unit in response to a request from the control terminal through the wired/wireless communication network.

3. The apparatus of claim 1, wherein the interface unit provides an interface for adding, eliminating, or changing information on the home network service environment stored in the storage unit.

4. The apparatus of claim 1, further comprising a setting unit for automatically establishing the home network service environment based on the information about incoming or outgoing vehicle, by storing digital appliance control commands made by the user at his or her home when his or her vehicle arrives in or exits out of a parking place and then analyzing usage patterns of the user on the basis of the commands.

5. The apparatus of claim 1, wherein the information about the incoming or outgoing vehicle is generated by identifying one of a radio identification mark, an RFID tag or a vehicle's license number attached to the vehicle in the entrance of a collective housing area or in a parking place.

6. The apparatus of claim 1,
   wherein the identification of the occupancy user at home is further made by an ID card having ID information on the occupancy user, and the occupant recognizing module recognizes the usage of the ID card in the entrance of the occupancy users and provides the occupancy user's ID information recognized from the ID card to the appliance controller.

7. The apparatus of claim 1, wherein the identification of the occupancy user at home is further made by a USIM (universal subscriber identity module) card installed in a mobile phone, and
   wherein the mobile phone periodically communicates to the appliance controller to inform of the occupancy user's information on the USIM card in the entrance of the occupancy user.

8. A method for control of digital appliances based on parking management, comprising:
   providing a control terminal with an interface for establishing a home network service environment that is dependent upon information about an incoming or outgoing vehicle;
   storing the home network service environment established by the interface in a storage unit;
   controlling the digital appliances based on the home network service environment stored in the storage unit, upon receipt of the information about the incoming or outgoing vehicle; and
   checking the presence of an occupancy user, prior to said controlling the digital appliances based on the home network service environment stored in the storage unit, wherein the checking the presence of the occupancy user at home is made by recognizing the usage of a digital door lock having ID information on the occupancy user in the entrance of the occupancy user.

9. The method of claim 8, further comprising:
   displaying information on the home network service environment stored in the storage unit on the control terminal in response to a request from the control terminal;
   providing the control terminal with a function of adding, eliminating, or changing the displayed information; and
   updating the information stored in the storage unit upon receipt of a request for addition, elimination, or change from the control terminal.

10. The method of claim 8, further comprising:
    establishing the home network service environment by analyzing a control pattern of the user taken to control the digital appliances when the user takes a vehicle in or out of the parking place.

11. The method of claim 8, wherein the checking the presence of the occupancy user at home is further made by recognizing the usage of an ID card having ID information on the occupancy user in the entrance of the occupancy user.

12. The method of claim 8, wherein the checking the presence of the presence of the occupancy user at home is further made by recognizing a USIM (universal subscriber identity module) card installed in a mobile phone in the entrance of the occupancy user.

\* \* \* \* \*